United States Patent

Lich

[11] 3,774,550
[45] Nov. 27, 1973

[54] FLUID RAILWAY VEHICLE SUSPENSIONS
[75] Inventor: Richard L. Lich, Town and Country, Mo.
[73] Assignee: General Steel Industries, Inc., St. Louis, Mo.
[22] Filed: Nov. 26, 1971
[21] Appl. No.: 202,129

[52] U.S. Cl. ...... 105/182 R, 105/197 B, 105/199 R, 105/206 R
[51] Int. Cl. .......... B61f 3/08, B61f 5/10, F61f 5/14
[58] Field of Search .................... 105/197 B, 199 R, 105/182 R, 197 B, 206 R

[56] References Cited
UNITED STATES PATENTS
| | | | |
|---|---|---|---|
| 3,548,755 | 12/1970 | Lich | 105/199 R |
| 3,646,893 | 3/1972 | Sundby | 105/197 B X |
| 3,286,655 | 11/1966 | Lich | 105/197 B |
| 3,231,257 | 1/1966 | Lich | 105/199 R X |
| 3,523,505 | 8/1970 | Lich | 105/197 B |
| 3,570,408 | 3/1971 | Lich | 105/199 R X |

Primary Examiner—Robert G. Sheridan
Assistant Examiner—Howard Beltran
Attorney—Bedell & Burgess

[57] ABSTRACT

A railway vehicle includes a truck having a pair of wheeled axles, truck framing supported on the axles, a vehicle body carried on the framing by separate flexible wall pneumatic spring devices seated on opposite sides of the truck framing. The truck framing is connected to the body to transmit longitudinal forces from the one to the other while accommodating their relative transverse and swivel movements. The spring devices are secured to the body and have similar bearing members on their lower ends in slidable engagement with horizontal bearing surfaces on the truck framing. The spring reservoirs are in the vehicle body, and the bearing members are held against longitudinal movement relative to the body and restricted to arcuate movements about the truck center. This arrangement eliminates the need for apertures in the bearing surfaces to provide air to the springs, as in some known arrangements wherein the springs are fixed to the truck and slidable with respect to the bearing surface on the car body, and the spring reservoir is in the car body.

10 Claims, 6 Drawing Figures

PATENTED NOV 27 1973

INVENTOR:
RICHARD L. LICH

BY: Bedell & Burgess
ATTORNEYS.

INVENTOR:

RICHARD L. LICH

BY: Bedell & Burgess
ATTORNEYS.

3,774,550

FLUID RAILWAY VEHICLE SUSPENSIONS

BACKGROUND OF THE INVENTION

1. Field of the Invention

The invention relates to railway rolling stock and consists particularly in vehicle suspensions including bolsterless trucks with pneumatic springs and pneumatic bearings.

2. Description of the Prior Art

Known trucks of the type having pneumatic springs and bearings have incorporated a bolster carried by the springs and pivoted to the car underframe on a vertical axis at the truck center, to fix the position of the springs in the horizontal plane. In such trucks the spring reservoirs have been in the car underframe, communication with the springs being through a hole in the body side bearing registrable with apertures in the top of the springs. This necessitates an effective seal around the aperture and limits the swivel angle of the truck because of the need for keeping the side bearing plate holes and the spring apertures in registry at all times.

SUMMARY OF THE INVENTION

The invention provides fluid railway vehicle suspensions in which the vehicle body is supported on the trucks by slidable mounting directly on spring-supporting bearings without the interposition of a bolster between the springs and body structure. The object is achieved by fixing the upper end of the upright spring devices to the body structure, and movably securing the lower end of the spring devices to the truck structure by generally transverse linkage systems and to the body structure by longitudinal anchor links. Other objects include the elimination of the necessity of constant registry between holes in slidably related spring and body bearing surfaces where pneumatic bearings are used, by fixedly securing the springs to a body mounted reservoir and slidably supporting the lower end of the springs on the truck structure.

DESCRIPTION OF THE PREFERRED EMBODIMENTS

Figure 1:
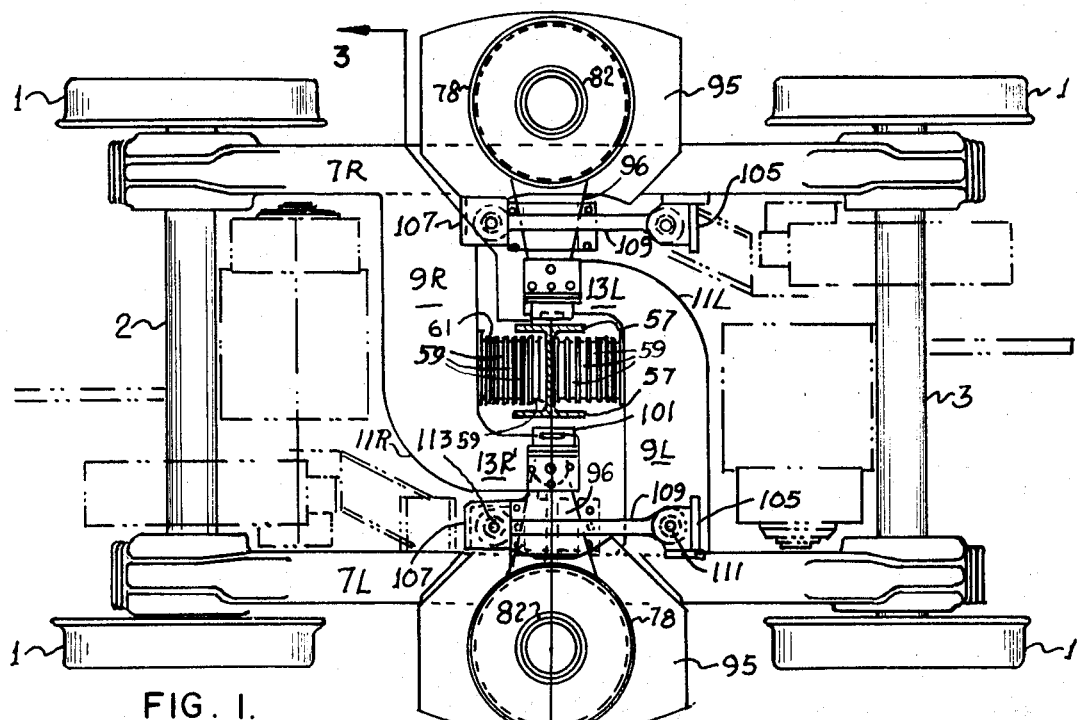
FIG. 1 is a top view of a railway truck with a portion of the supported car body horizontally sectionalized, incorporating one form of the invention.
Figure 2:
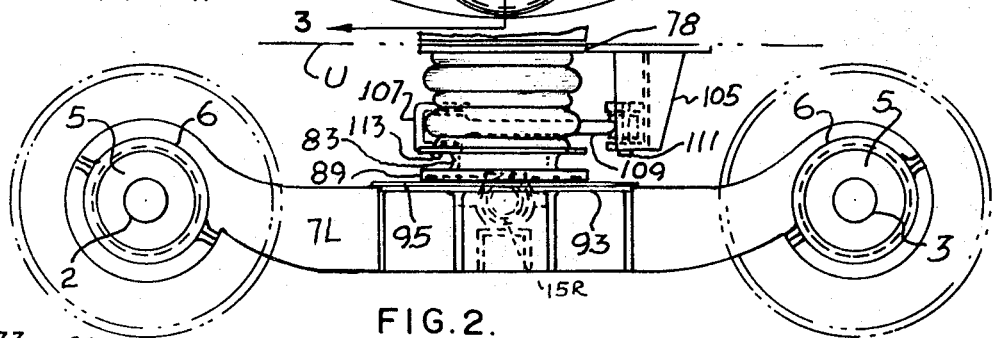
FIG. 2 is a side elevational view of the truck illustrated in FIG. 1.
Figure 3:
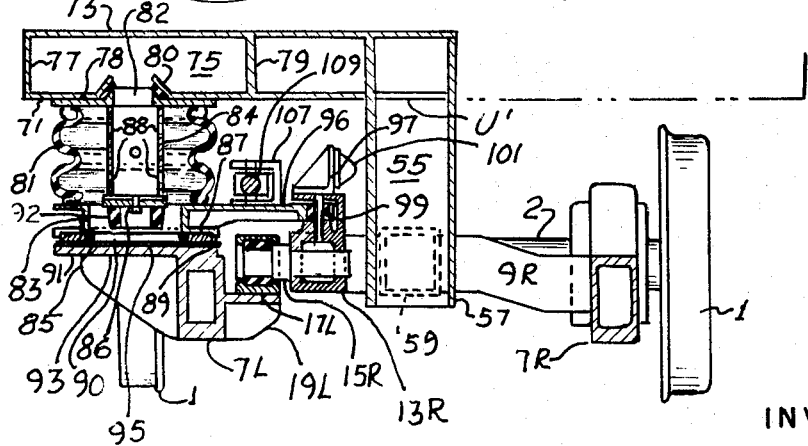
FIG. 3 is a transverse vertical sectional view along line 3—3 of FIG. 1.

Referring to FIGS. 1–3, the numeral 1 denotes railway flanged wheels mounted in gauged pairs on longitudinally spaced railway axles 2 and 3. Inboard of wheels 1, axles 2 and 3 are rotatably received in journal boxes 5, preferably inboard of wheels 1.

A pair of parallel, transversely spaced, longitudinally extending side frames are supported at their ends on journal boxes 5, to which they are secured by elastomeric grommets 6. Side frames 7L and 7R are formed respectively with integral inboard stub transoms 9L and 9R offset longitudinally of the truck from each other equal distances fore and aft of the truck center, with their free end portions curved as at 11L and 11R toward the truck center adjacent the opposite side frame. Their respective extremities 13L and 13R rigidly mount trunnion pins 15L and 15R aligned with each other on the transverse center line of the truck. Trunnion pins 15L and 15R project transversely toward the opposite side frame and are pivotally received respectively in bearings 17R and 17L respectively, mounted inboard of their respective side frames on side frame brackets 19L and 19R. To eliminate metal-to-metal contact and wear, and facilitate pivoting of the trunnion pins in the bearings, an elastomeric bushing is compressed into each bearing surrounding the trunnion pin therein. With this arrangement, side frames 7R and 7L are enabled to accommodate themselves to vertical differences in the track rails and thereby maintain substantially equal distribution of the truck load to the wheels, by tilting relative to each other about the common axis of trunnion pins 15R and 15L.

Vehicle body structure, including an underframe U, is positioned above the truck structure thus far described and supported thereon in the manner described hereinafter.

For transmitting longitudinal acceleration and retardation forces between the truck and the body, body underframe structure U may mount a depending vertical post of I cross section having a transverse web 55 and longitudinal flanges 57. Post 55, 57 projects into the space between stub transoms 9L and 9R and sandwich devices comprising transverse elastomeric pads 59 and interlined metal plates 61 are compressed longitudinally between web 55 and transoms 9L and 9R respectively.

Body underframe U is formed midway between axles 2 and 3 with transverse hollow box-section body bolster having a bottom wall 71, a top wall 73, transversely extending side walls 75 and an end wall 77. Partitions 79 extending across the bolster intermediate the sides of the underframe and its center define with walls 71, 73, 75 and 77 a pair of pneumatic spring reservoirs, and for resiliently supporting the body on the truck flexible wall pneumatic springs, a rigid top member 78, an upright flexible wall member, bellows 81 sealingly secured to top member 78, and an annular rigid bearing member 83 sealingly secured to the bottom of bellows 81. The rigid top members 78 are secured to reservoir bottom wall 71 and communicate with the reservoir through a central opening defined by an upstanding circular flange 82 which projects into an opening similarly flanged at 80 in reservoir bottom wall 71, and a vertical tubular column 84 is secured at its top to top member 78 and has its lower end closed as at 86. To permit passage of air between reservoir and the interior of bellows 81, column 84 is perforated as at 88.

Each annular rigid bearing member 83 is formed with a central vertical aperture 85 surrounded at its lower end by a horizontal annular flange 87 with a downturned peripheral rim 89. An annulus 91 of Teflon or similar tough material having low surface friction is positioned against flange 87 within rim 89 to form a sliding bearing surface for the spring. To provide an air seal, an elastomeric ring 90 is positioned within the rabbet defined by the inner edge of annulus 91 and the inner margin of flange 87.

For supporting each spring device 81, 83 on the truck framing, each side frame 7L is depressed intermediate its ends and there formed with an outwardly projecting horizontal shelf 93, the top surface of which is coplanar with that of the side frame, and a bearing plate 95 is preferably secured to the top surface, annulus 91 resting slidably on plate 95.

To provide some resilient support for the body in the event of failure of the spring air supply, an annular elastomeric bumper 92 is mounted on the bottom of column bottom plate 86, and is normally spaced above bearing plate 95.

For holding bearing member 83 against transverse movement with respect to the truck, while permitting arcuate movement of the spring device with respect to the truck framing about a vertical axis near the truck center, so that lateral movements of the body on the truck are accommodated by horizontal shear in bellows 81, bearing member 83 is formed with a transversely inboard arm 96 pivotally connected at its inner end at 97 to an upstanding bracket 99 on the adjacent end 13R or 13L of the opposite side frame transom.

For resiliently limiting lateral movements of the body underframe U on the truck, a transversely inwardly directed elastomeric bumper 101 is mounted on top of bracket 99 in transversely spaced relation with flanges 57 of depending central post 55, 57.

For holding each bearing member 83 against longitudinal movement with respect to the body underframe so that all swivel movements will be accommodated by sliding of bearing member annulus 91 on plate 95, brackets 105 depend from underframe U in longitudinally spaced relation respectively with bearing member arms 96, and each of the latter is formed intermediate its ends with an upstanding bracket 107 normally aligned longitudinally of the truck with bracket 105. Longitudinally extending anchor links 109 are pivotally connected by elastomerically-bushed pivots at 111 and 113 respectively to brackets 105 and 107.

At its center elastomeric pad devices 59, 61 are compressed between transoms 9L and 9R respectively and underframe post web 55, as in the embodiment of FIGS. 1-3.

Operation of the embodiment of FIGS. 1-3 is as follows: As the vehicle equipped with a pair of identical trucks moves along tangent track, compressed air introduced into bellows 81 through the body bolster reservoir 71, 73, 75, 77 keep bellows 81 inflated to a predetermined height and bears directly, through bearing member aperture 85, on truck side bearing plate 95 to relieve bearing member annuli 91 of part of the body load and thus facilitate truck swivel on curved track. When the vehicle enters curved trackage, yielding of pad devices 59, 61 permits the truck to swivel about post 55, 57, and longitudinal links 109 hold spring device bearing members 83 against swivel with respect to underframe U, so that swivel is accommodated by arcuate sliding movements, about pivots 101, of annuli 91 on truck bearing plates 95, swivel being facilitated by the reduction in frictional resistance effected by air pressure acting through bearing member apertures 85 against the respective truck bearing plates. If a bellows 81 should be ruptured, or the air supply fail, elastomeric bumper 90 would engage the truck bearing plate 95 and thus temporarily resiliently support the body.

Figure 4:
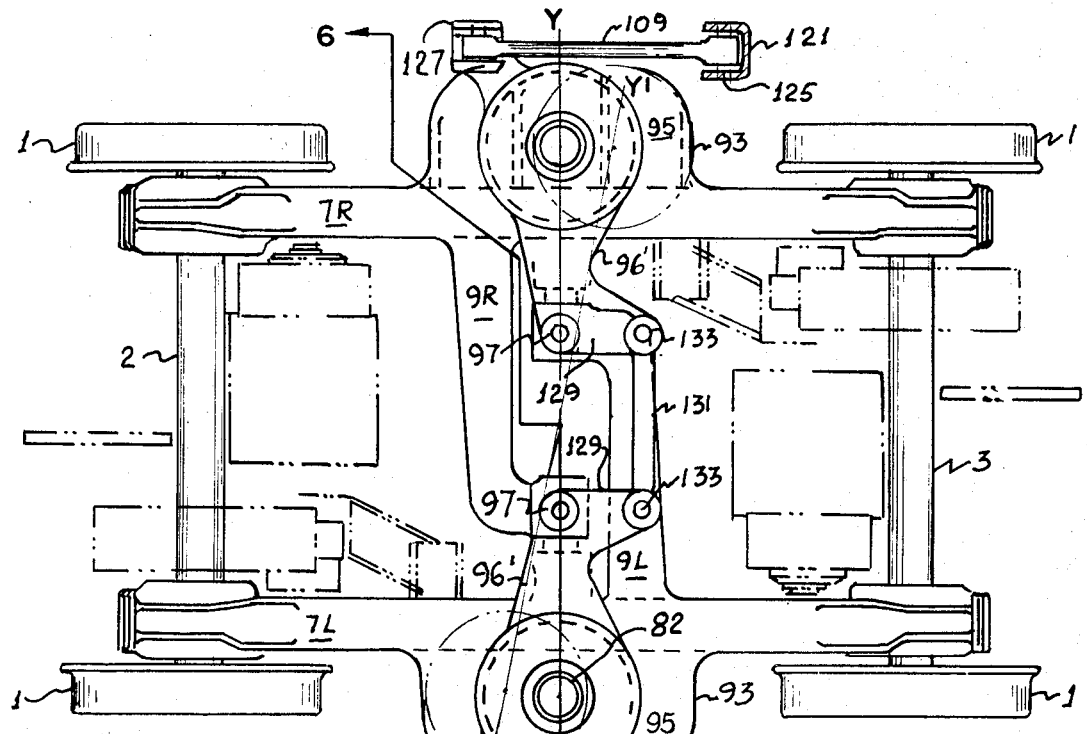
FIG. 4 is a top view of a railway truck with depending portions of the supported car body horizontally sectionalized, incorporating a second form of the invention.
Figure 5:
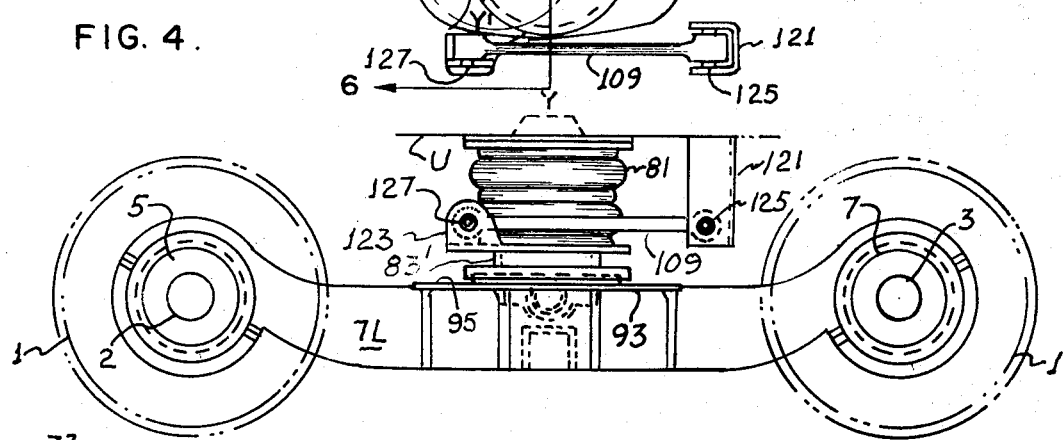
FIG. 5 is a side elevational view of the truck illustrated in FIG. 4.
Figure 6:
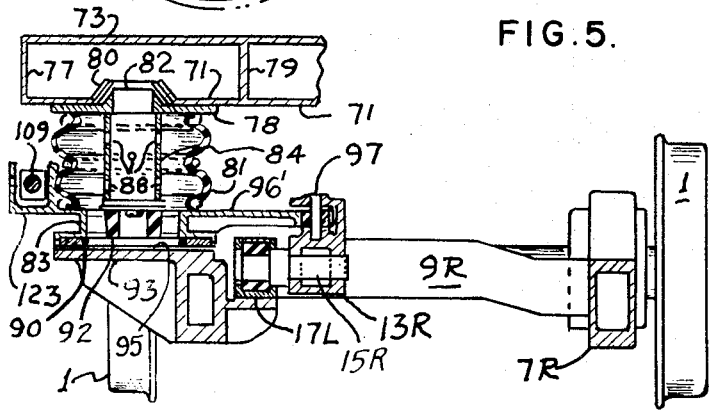
FIG. 6 is a transverse vertical sectional view along line 6—6 of FIG. 4.

In the embodiment of the invention illustrated in FIGS. 4-6, the body underframe, truck framing, and spring device except for the radius arm, are substantially identical to corresponding parts of the embodiment of FIGS. 1-3, and the same reference numbers are used in FIGS. 4-6 to denote these substantially identical parts.

The second embodiment differs from the first embodiment principally in the elimination of the post 55, 57 and pad devices 59, 61 and the provision, instead, of longitudinal anchors and a linkage between the spring devices at both sides of the truck to transmit longitudinal forces from the truck to the underframe and to fix a swivel center for the truck.

In this embodiment, body anchor link brackets 121 are located transversely outboard of the spring devices, and the spring bearing member anchor brackets 123 are similarly located outboard of the springs. Anchor links 109, identical to those of the first embodiment, are pivotally connected at 125 and 127 respectively to brackets 121 and 123, whereby to hold spring bearing members 81 against longitudinal movement with respect to the underframe.

Spring device bearing member radius arms 96', like those of the first embodiment, are pivotally connected at 97 to the ends 13R and 13L of the transoms of the opposite side frames. Arms 96', however, constitute the transverse arms of bell cranks, each having an arm 129 extending in the same direction longitudinally of the truck from pivots 97, and a transversely extending link 131 is pivotally connected by elastomerically bushed pivots 133 to the extremities of bell crank longitudinal arms 129. With this arrangement, as in the previous embodiment, relative lateral cushioning movements of the vehicle body on the truck are accommodated by lateral shear of bellows 81, the top of which is secured to body bolster bottom wall 71, and the bottom of which is held against transverse movement relative to the truck by bell crank arm 96'.

On tangent track, with body anchor link brackets 121 aligned transversely of the truck, anchor links 109 oppose pivoting of spring device bearing member arms 96' in one direction longitudinally of the truck while transverse links 131 opposes pivoting of arms 96' in the opposite direction, links 109 and 131 thus cooperatong to maintain the spring device bearing members in the solid line positions shown in FIG. 4, with longitudinal forces being transmitted from the truck to the underframe through pivots 97, arms 96' and anchor links 109.

On curved trackage, the common axis of longitudinal anchor link pivots 125 to body brackets 121 shifts from the normal position transverse of the truck to a slightly diagonal position, causing corresponding pivoting of spring bearing member arms 96' about their pivots 97, arms 129 being maintained parallel by link 131 so that arcuate movement of one spring bearing member 81 in one longitudinal direction is accompanied by arcuate movement of the other bearing member in the opposite longitudinal direction, to the broken-line positions of FIG. 4, the normally transverse line Y—Y connecting the vertical axes of the spring devices at each side being shifted from its transverse position to a slightly diagonal position Y'—Y' with respect to the truck parallel to the common axis of anchor pivots 125, but intersecting Y—Y at the center of the truck. Thus on curved as well as tangent track, longitudinal forces are transmitted from the truck to the vehicle body by pivots 97, arms 96', bearing members 81' and anchor links 109.

Operation of the second embodiment is otherwise similar to that of the first embodiment.

The details of the suspensions disclosed herein may be modified substantially without departing from the spirit of the invention and the exclusive use of any modifications as come within the scope of the appended claims is contemplated.

I claim:

1. In a railway vehicle, a truck comprising a pair of wheeled axles spaced apart longitudinally of the truck, truck framing supported on said axles, upwardly facing bearing surfaces on the sides of said truck framing intermediate said axles, vehicle body structure positioned above said truck structure and including separate air reservoirs at its opposite sides, separate spring devices at the opposite sides of the vehicle including upright flexible wall members fixedly secured at their upper ends to said body structure at the respective sides thereof in communication with said reservoirs and rigid bearing members at their lower ends slidably mounted on said upwardly facing bearing surfaces, and means confining said bearing members to arcuate movement on said upwardly facing bearing surfaces about vertical axes in the central region of said truck framing and retaining said bearing members against substantial movement lengthwise of said body structure.

2. In a railway vehicle according to claim 1, said bearing members being vertically apertured to permit compressed air in said flexible wall members to bear against said truck framing.

3. In a railway vehicle according to claim 2, each said spring device comprising a rigid top member sealingly secured to the upper end of said flexible wall member and having a central aperture for communication with the respective reservoir, a hollow rigid tubular member secured to said top member and surrounding said aperture therein, said tubular member depending from said top member within said flexible wall member to a level higher than the bottom of said bearing member and being enclosed at its lower end, said tubular member being perforated to provide air communication between its interior and the surrounding interior of said flexible wall member.

4. In a railway vehicle according to claim 3, each said tubular member mounting on its lower enclosed end a downwardly facing elastomeric stop member in normally vertically spaced relation with said truck framing for supporting said vehicle body structure on said truck framing in the event of failure of said pneumatic springs.

5. In a railway vehicle according to claim 1, said confining means comprising transversely inwardly extending radial arms rigid with said respective bearing members and pivoted at their inner ends to said truck framing transversely inboard of said bearing members and outboard of the truck center.

6. In a railway vehicle truck according to claim 5, said retaining means comprising a pair of links extending longitudinally of the vehicle at the sides thereof and each pivotally connected at its one end to said vehicle body structure and at its other end to the respective spring device bearing member.

7. In a railway vehicle truck according to claim 6, means at the center of the truck connecting said truck framing to said body structure for transmitting longitudinal movements therebetween while permitting relative vertical, transverse and swivel movements.

8. In a railway vehicle truck according to claim 7, said truck framing having transverse vertical surface means spaced apart longitudinally of the truck symmetrically with respect to the truck center, a vertical post depending from said vehicle body structure at the center of the truck and into the space between said truck framing transverse surfaces in spaced relation with said surfaces, and elastomeric pad devices compressed into the spaces between said post and said surfaces.

9. In a railway vehicle truck according to claim 6, bell cranks comprising said transverse extending arms and arms extending longitudinally of the truck from the inner ends of said transversely extending arms respectively, and a transverse link connecting the outer ends of said longitudinal arms to each other.

10. In a railway vehicle truck according to claim 9, said longitudinally extending links being positioned transversely outboard of the respective spring devices.

* * * * *